United States Patent

[11] 3,610,570

| [72] | Inventor | Curtis L. Erwin, Jr. |
| | | 5010 S.E. 41st Ave., Portland, Oreg. 97201 |
| [21] | Appl. No. | 805,546 |
| [22] | Filed | Mar. 10, 1969 |
| [45] | Patented | Oct. 5, 1971 |

[54] PROTECTIVE ADAPTER FOR DIAPHRAGM-TYPE VALVE
1 Claim, 1 Drawing Fig.

[52] U.S. Cl. ................................................ 251/63.4, 251/63.6, 137/544
[51] Int. Cl. .......................................... F16k 31/143
[50] Field of Search .......................................... 251/63.4, 63.6, 60, 62, 61.4, 63.5, 25, 61.1; 137/544, 545

[56] References Cited
UNITED STATES PATENTS

| 1,623,431 | 4/1927 | McVoy | 251/63.4 |
| 2,476,378 | 7/1949 | Jajneri | 251/63.4 |
| 2,663,153 | 12/1953 | Grant, Jr. | 251/63.4 X |
| 2,926,694 | 3/1960 | MacGlashan, Jr. et al. | 137/544 |
| 2,199,549 | 5/1940 | Saunders | 251/25 |

FOREIGN PATENTS

| 193,212 | 12/1953 | Austria | 251/63.4 |

*Primary Examiner*—Arnold Rosenthal
*Attorney*—Eugene M. Eckelman

ABSTRACT: An adapter having a body portion with a bore for slideably receiving a valve-operating projecting rod on a plunger and also having a counterbore for receiving the head of the plunger. A seat is formed in the body portion, and the plunger is selectively engageable with such seat when an operating pressure exists in the system such that the rod upon seating of the plunger has moved the diaphragm-type valve to an operative position. Through the arrangement of seating of the plunger in the body portion and predetermined length of the rod the plunger exerts the same operating pressure on the diaphragm-type valve regardless of the pressure to which the plunger is subjected. The housing has an inlet opening leading to the counterbore for the entrance of plunger-operating fluid, and such opening has fluid inlet-restricting means therein for feeding fluid under pressure to the plunger at a slow rate to prevent shock operation of said plunger.

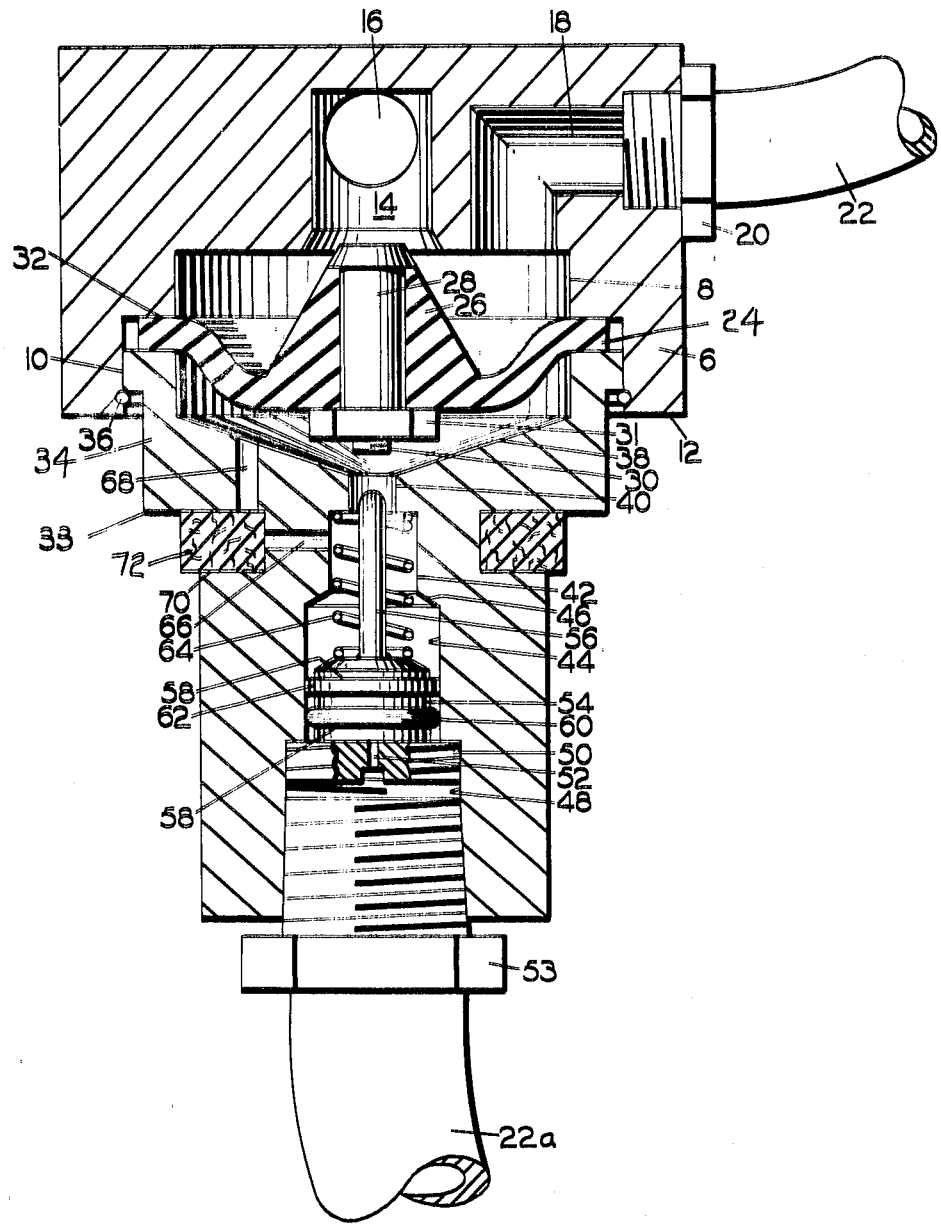
CURTIS L. ERWIN, JR.
INVENTOR.
BY Eugene M. Eckelman
ATTY.

3,610,570

PROTECTIVE ADAPTER FOR DIAPHRAGM-TYPE VALVE

BACKGROUND OF THE INVENTION

This invention relates to a novel protective adapter for diaphragm-type valves.

Diaphragm-type valves are often subjected to substantially high pressures in their operation, and in order to withstand such pressures they have to be constructed of heavy material. Such causes the valves to be less responsive than the more flexible valves. Such valves are also expensive to manufacture. Therefore, a primary objective of the present invention is to provide a protective adapter for diaphragm-type valves which overcomes the disadvantages pointed out above in that it isolates the diaphragm-type valve from the fluid-operating pressure but at the same time it is capable of operating the valve with the same degree of effectiveness as would a direct connection between the fluid pressure line and and the valve, thus permitting a lightweight and inexpensive valve to operate efficiently whether in a low-pressure or high-pressure system.

More particular objects of the present invention are to provide an adapter of the type described employing a plunger which is operated by the pressure system and which has an operating rod secured thereto for engaging the valve, the plunger being associated with a seat which limits movement thereof whereby the valve is engaged by a similar pressure by the operating rod regardless of the pressure in the pressure line; to provide a novel arrangement of porting to prevent air lock of the plunger and valve; and to provide insert means in the fluid inlet to the plunger for restricting fluid flow and facilitating a smooth, shock-free movement of the plunger to a valve-operating position.

The invention will be better understood and additional objects and advantages will become apparent from the following description which illustrates a preferred form of the device.

BRIEF DESCRIPTION OF THE DRAWINGS

The drawing FIGURE is a longitudinal sectional view of a protective adapter for diaphragm-type valves embodying features of the present invention.

DETAILED DESCRIPTION OF THE PREFERRED EMBODIMENT

Referring in particular to the drawings, the numeral 6 designates a valve housing having an interior area 8 with an enlarged or counterbore portion 10 opening through one end 12 of the housing. Housing 6 is provided with a small bore 14 leading from area 8 toward the end opposite the open end 12 of the housing. An inlet opening 16 leads from the exterior of the housing into the bore 14 and an outlet 18 leads from the area 8 to the exterior of the housing. The inlet 16 and outlet 18 have suitable fittings 20 for connection to conduits 22 in the system.

Mounted laterally across the counterbore 10 is a diaphragm 24 having a cone-shaped valve portion 26 directed toward the bore 14 and arranged to seal off the adjacent end of the bore 14 upon the application of pressure to the front side of the diaphragm, namely, the bottom side as illustrated in the drawings. In a preferred construction, the diaphragm includes an axial metal core 28 having a threaded shank 30 which receives a nut 31 for securing the core to the diaphragm. The counterbore 10 forms an annular shoulder 32 with the area 8 for abutment by an outer portion of the diaphragm.

In the interior 8 of the housing is closed at the front side of the diaphragm, namely at the open end 12 by an adapter housing 33. The housing 33 has an enlarged head portion 34 received in the counterbore 10, and this head portion bears securely against diaphragm 24 to provide a sealed joint between the diaphragm and the shoulder 32. Adapter housing 33 is held removably but securely in the housing 10 by a snapring connection 36.

The housing 33 is recessed to form an end area 38 at its inner end. An axial bore 40 leads from the area 38 to a first counterbore 42 in turn leading to a second counterbore 44. The shoulder 46 formed between the counterbores 42 and 44 comprises a stop shoulder as will be more apparent hereinafter. The counterbore 44 leads to a threaded third counterbore 48 for receiving an externally threaded washer-like or disclike insert 50 having an orifice 52 therethrough. A fitting 53 is threadedly engaged in the threaded bore 48 for connecting housing 33 into a pressure system which includes a conduit 22a.

Slidable in the counterbore 44 is a plunger 54 having a rod portion 56 which extends through the counterbore 42 and bore 40. Plunger 54 has a pair of peripheral grooves 58 for receiving an O-ring 60 and a backup washer 62. O-ring 58 and washer 62 provide a sliding sealing fit of the plunger in the counterbore. Mounted on the rod 56 is a compression spring 64 which extends into the counterbore 42 and has end abutment between the plunger and the one end of counterbore 42. This spring urges the plunger away from the diaphragm to a rest position but is capable of being overcome by pressure of the fluid system in conduit 22a to allow movement of the plunger toward the diaphragm.

The interior of housing 33 and the interior of head portion 34 are vented to atmosphere by ports 66 and 68, respectively, leading into a single annular groove 70 in the housing 33. Groove 70 contains a filter 72 therein to prevent foreign particles from entering the working parts of the adapter. The vent means 66, 68 and 70 prevent any fluid lock in the system in the operation of diaphragm 24 or plunger 54.

In the normal or rest position of the plunger 54, the spring 64 retracts the plunger to a position such that the tip of rod 56 is withdrawn from engagement with the shank 30 of the valve core 28. Valve 26 will thus be open for flow of fluid through the housing 6, namely from inlet 16, through area 8, and out outlet 18. However, when pressure is applied in the line 22a such fluid passes through the orifice 52 in the insert 50 and forces the plunger inwardly to a position such that rod 56 engages the shank 30 of the valve core 28. Such operation of the plunger moves the valve portion 26 into seated engagement with the walls of bore 14 to shut off the flow of fluid through inlet 16 and outlet 18. The purpose of the adapter is to protect the valve 26 from high fluid pressures which may exist in line 22a. That is, regardless of the pressure in the line 22a the piston seats on shoulder 46 and the valve is subjected to substantially the same closing pressure. The parts are dimensioned and arranged such that the valve is firmly closed when the plunger abuts against the shoulder 46. The resistive force of the spring 64 is preselected to determine the minimum pressure to seat the plunger, and obviously the adapter can be made to operate under very small pressure and yet to protect the valve structure up to extremely high pressures.

The orifice 52 in the insert 50 is of restricted size so that when pressure is applied in line 22a such pressure gradually reaches the plunger 52 so that the plunger and rod 56 will work slowly to prevent shock operation of the plunger against the valve 26.

It is to be understood that the form of my invention herein shown and described is to be taken as a preferred example of the same and that various changes in the shape, size and arrangement of parts may be resorted to without departing from the spirit of my invention.

Having thus described my invention, I claim:

1. Protective apparatus for a valve diaphragm which controls fluid movement in a flow system and is operative by the pressure from a control system for the flow system, comprising a valve housing, means in said housing arranged to connect said housing to said flow system and to said control system, a valve member in said housing movably operable between an open position for allowing fluid flow through the flow system and a closed position for preventing fluid flow through the control system, said valve member comprising a diaphragm-type valve having a cone-shaped resilient portion arranged to engage said seat for preventing fluid flow through said flow system, a plunger in said housing movably operable between a first position which allows movement of said valve member to its open position and a second position which pushes the valve member to its closed position, said plunger being arranged to be moved to its second position by pressure in said control system, a head on said valve member disposed on the plunger side thereof, said valve member and plunger being comprised of independent parts and said plunger in moving to its second position engaging said head of the valve member, stop means in said housing stopping said plunger in its second position such that the bearing force of said plunger against said valve member at a selected pressure to seat the latter and at pressures thereabove in said control system is substantially the same regardless of the pressure operating on said plunger, and means arranged to restrict the flow of pressure from said control system to said plunder to cause slow, shock-free movement of said plunger.